(12) United States Patent
Hiramoto et al.

(10) Patent No.: US 8,847,455 B2
(45) Date of Patent: Sep. 30, 2014

(54) ROTARY ELECTRIC MACHINE AND DRIVING CONTROLLER FOR ROTARY ELECTRIC MACHINE

(75) Inventors: Kenji Hiramoto, Owariasahi (JP); Hideo Nakai, Nisshin (JP); Eiji Yamada, Owariasahi (JP); Norimoto Minoshima, Kariya (JP); Masahiro Seguchi, Obu (JP)

(73) Assignees: Kabushiki Kaisha Toyota Chuo Kenkyusho, Aichi (JP); Toyota Jidosha Kabushiki Kaisha, Toyota (JP); Kabushiki Kaisha Toyota Jidoshokki, Kariya (JP); Denso Corporation, Kariya (JP)

( * ) Notice: Subject to any disclaimer, the term of this patent is extended or adjusted under 35 U.S.C. 154(b) by 933 days.

(21) Appl. No.: 12/740,044

(22) PCT Filed: Oct. 17, 2008

(86) PCT No.: PCT/JP2008/068897
§ 371 (c)(1),
(2), (4) Date: May 12, 2010

(87) PCT Pub. No.: WO2009/057467
PCT Pub. Date: May 7, 2009

(65) Prior Publication Data
US 2010/0259136 A1    Oct. 14, 2010

(30) Foreign Application Priority Data
Oct. 29, 2007 (JP) ................... 2007-280228

(51) Int. Cl.
*H02K 3/28* (2006.01)
*H02K 21/04* (2006.01)
*H02K 19/28* (2006.01)
*H02K 19/12* (2006.01)
*H02K 1/22* (2006.01)

(52) U.S. Cl.
CPC .............. *H02K 19/12* (2013.01); *H02K 21/042* (2013.01); *H02K 19/28* (2013.01); *H02K 1/223* (2013.01)
USPC ........................................ 310/180; 310/179

(58) Field of Classification Search
USPC ....... 310/68 D, 179–181, 159, 162, 269, 168, 310/216.075
See application file for complete search history.

(56) References Cited

U.S. PATENT DOCUMENTS 5,397,975 A * 3/1995 Syverson ......................... 322/46
5,598,091 A * 1/1997 Satake et al. .................... 322/62

(Continued)

FOREIGN PATENT DOCUMENTS

CN    1933298    3/2007
JP    A-58-63057    4/1983

(Continued)

OTHER PUBLICATIONS

Office Action issued in Japanese Application No. 2007-280228 dated Sep. 6, 2011 (with partial translation).

(Continued)

*Primary Examiner* — Quyen Leung
*Assistant Examiner* — Naishadh Desai
(74) *Attorney, Agent, or Firm* — Oliff PLC

(57) ABSTRACT

A plurality of salient poles projecting toward a stator are arranged on a rotor core along the circumferential direction while being spaced apart from each other, and rotor windings are wound around these salient poles. The rotor windings are short-circuited through diodes, respectively; and when currents rectified by the diodes flow through the rotor windings, the salient poles are magnetized to produce a magnet where the magnetic pole is fixed. The width θ of each salient pole in the circumferential direction is smaller than a width corresponding to an electric angle of 180° of the rotor, and the rotor windings are wound around each salient pole by short-pitch winding.

15 Claims, 13 Drawing Sheets

(56) References Cited

U.S. PATENT DOCUMENTS

| | | | |
|---|---|---|---|
| 6,130,492 A | | 10/2000 | Satake et al. |
| 6,166,470 A | * | 12/2000 | Miyazawa et al. ............ 310/181 |
| 6,271,613 B1 | * | 8/2001 | Akemakou et al. ............ 310/181 |
| 6,396,188 B1 | * | 5/2002 | Kliman et al. ............. 310/261.1 |
| 7,358,698 B2 | * | 4/2008 | Seguchi et al. ............... 318/700 |
| 2003/0071531 A1 | * | 4/2003 | DeCesare ..................... 310/181 |
| 2003/0178909 A1 | * | 9/2003 | Kusase et al. ................. 310/254 |
| 2006/0290316 A1 | | 12/2006 | Seguchi et al. |
| 2008/0169717 A1 | * | 7/2008 | Takashima et al. ........... 310/114 |

FOREIGN PATENT DOCUMENTS

| | | | |
|---|---|---|---|
| JP | A-59-61457 | 4/1984 | |
| JP | U-60-147999 | 10/1985 | |
| JP | A-62-23348 | 1/1987 | |
| JP | A-1-264551 | 10/1989 | |
| JP | 04285454 A * | 10/1992 | ............ H02K 19/28 |
| JP | A-4-285454 | 10/1992 | |
| JP | A-05-227688 | 9/1993 | |
| JP | A-7-222416 | 8/1995 | |
| JP | A-8-65976 | 3/1996 | |
| JP | A-11-220857 | 8/1999 | |
| JP | A-2006-288183 | 10/2006 | |
| JP | A-2007-185082 | 7/2007 | |
| WO | WO 2006/057206 A1 | 6/2012 | |

OTHER PUBLICATIONS

Nov. 26, 2012 Office Action issued in Chinese Patent Application No. 200880113895.2 (with translation).

International Search Report mailed Jan. 6, 2009 in International Application No. PCT/JP2008/068897.

Mar. 28, 2012 Office Action issued in Chinese Patent Application No. 200880113895.2 (with translation).

International Preliminary Report on Patentability dated Jun. 1, 2010 in International Application No. PCT/JP2008/068897 (with translation).

Oct. 2, 2012 Notice of Grounds for Rejection issued in Japanese Patent Application No. 2007-280228 (with partial English Language translation).

Extended European Search Report issued in European Application No. 08845974.8 dated May 29, 2012.

Korean Office Action issued in Korean Application No. 2010-7011805 dated May 29, 2012 (with translation).

Oct. 10, 2011 Office Action issued in Korean Patent Application No. 10-2010-7011805 (with translation).

Chinese Decision of Rejection (Excerpt) issued May 9, 2013 in Chinese Patent Application No. 200880113895.2 w/English-language Translation.

Nov. 14, 2013 Office Action issued in Chinese Patent Application No. 200880113895.2 (with excerpt English Translation).

Dec. 2, 2013 Office Action issued in Korean Patent Application No. 2010-7011805 (with excerpt English Translation).

* cited by examiner

ROTARY ELECTRIC MACHINE AND DRIVING CONTROLLER FOR ROTARY ELECTRIC MACHINE

TECHNICAL FIELD

The present invention relates to a rotary electric machine including a stator and a rotor that are disposed in spaced confronting relationship, and to a driving controller for the rotary electric machine.

BACKGROUND ART

A brushless power generator disclosed in the following Patent Document 1 includes a main power generation winding and an exciting winding that are wound around a stator, a field winding and an auxiliary field winding that are wound around a rotor, a diode that short-circuits the exciting winding of the stator, and a rectifier that rectifies a current flowing from the auxiliary field winding to the field winding of the rotor. According to Patent Document 1, when the rotor starts rotating, an induced voltage is generated on the exciting winding of the stator due to a residual magnetism of a field core of the rotor. Exciting current flows in one direction via the diode and a static magnetic field is generated on the stator. As the rotor rotates in the static magnetic field, an induced voltage is generated on the auxiliary field winding wound around the field core of the rotor. Field current rectified by the rectifier flows through the field winding. Therefore, magnetic poles of N-poles and S-poles are generated on the rotor.

The following Patent Document 2 discloses a reactor connected to a main power generation winding of a stator, which is arranged as a concentrated full-pitch winding, instead of providing the above-described exciting winding on the stator. According to Patent Document 2, when the rotor starts rotating, a residual field of a rotor core induces an electromotive force on the main power generation winding of the stator. The induced electromotive force causes a reactor exciting current that flows, as armature current, in a closed circuit including the main power generation winding and the reactor. As a result, an armature reaction magnetic field is generated. In this case, because the main power generation winding of the stator is the concentrated full-pitch winding, the generated armature reaction magnetic field includes harmonics components (a fifth space harmonics magnetic field). The armature reaction magnetic field including the fifth space harmonics magnetic field interlinks with the auxiliary field winding of the rotor. Accordingly, an electromotive force is generated on the auxiliary field winding. A diode bridge circuit converts the generated electromotive force into a direct current that can be supplied as field current to a field winding of the rotor. Therefore, magnetic poles of N-poles and S-poles are generated on the rotor.

The following Patent Document 3 discloses an arrangement that does not include the above-described auxiliary field winding of the rotor and, instead, uses a diode that short-circuits a full-pitch field winding of the rotor. According to Patent Document 3, when the rotor starts rotating, a residual field of a rotor core induces an electromotive force on the main power generation winding of the stator. The induced electromotive force causes a reactor exciting current that flows, as armature current, in a closed circuit including the main power generation winding and the reactor. As a result, an armature reaction magnetic field is generated. Further, an electromotive force is induced on the field winding of the rotor that is magnetically connected to odd-order space harmonics components of the armature reaction magnetic field. Field current rectified by the diode flows through the field winding. As a result, magnetic poles of N-poles and S-poles are generated on the rotor. Further, the following Patent Document 4 discloses a parallel connection of the above-described full-pitch field windings of the rotor for the purpose of increasing the field current that flows through the field winding.

According to Patent Documents 1 and 2, the exciting winding or the reactor is provided on the stator in addition to the main power generation winding. Further, the auxiliary field winding is provided on the rotor in addition to the field winding. Therefore, the winding structure tends to be complicated, and downsizing the entire winding structure becomes difficult. According to Patent Documents 3 and 4, the auxiliary field winding of the rotor is omitted because the field winding of the rotor is short-circuited via the diode. However, the exciting winding or the reactor is provided on the stator in addition to the main power generation winding. Therefore, the winding structure tends to be complicated. Further, according to Patent Documents 3 and 4, it is difficult to efficiently generate the electromotive force, which is induced by the space harmonics components, on the field winding of the rotor, because the field winding of the rotor is a full-pitch winding. It is therefore necessary to use the exciting winding or the reactor of the stator, other than the main power generation winding, to generate the electromotive force to be induced by the space harmonics components on the field winding of the rotor.

Patent Document 1: JP 62-23348 A
Patent Document 2: JP 4-285454 A
Patent Document 3: JP 8-65976 A
Patent Document 4: JP 11-220857 A

DISCLOSURE OF THE INVENTION

The present invention has an advantage to efficiently generate the electromotive force to be induced by the harmonics components on the rotor winding and efficiently increase the torque of the rotor. Further, the present invention has another advantage to simplify the winding structure of a rotary electric machine.

A rotary electric machine according to the present invention includes a stator and a rotor, which are disposed in spaced confronting relationship. The stator includes a stator core on which a plurality of slots are formed and spaced apart from each other in a circumferential direction around a rotor rotational shaft, and stator windings of a plurality of phases that are provided in the slots and wound around the stator core by concentrated winding, in which a rotating magnetic field including harmonics components is formed when AC currents flow through the stator windings. The rotor includes a rotor core, rotor windings wound around the rotor core to generate an induced electromotive force when interlinked with the rotating magnetic field including the harmonics components formed by the stator, and a rectifying element that rectifies currents flowing through the rotor windings in response to generation of the induced electromotive force. The rotor core includes a plurality of magnetic pole portions, around which the rotor windings are wound, which can function as magnets where the magnetic pole is fixed. The magnetic pole portions are magnetized when the currents rectified by the rectifying element flow through the rotor windings. The magnetic pole portions are disposed in spaced confronting relationship with the stator in a state where the magnetic pole portions are spaced apart from each other in the circumferential direction. Further, the rotor windings are wound around respective magnetic pole portions by short-pitch winding.

According to an aspect of the present invention, it is preferable that the width of the rotor winding wound around each magnetic pole portion in the circumferential direction is substantially equal to a width corresponding to an electric angle of 90°.

According to an aspect of the present invention, it is preferable that each magnetic pole portion of the rotor core has a magnetic resistance that is smaller than a magnetic resistance of a portion corresponding to a position between magnetic pole portions in the circumferential direction. Further, according to an aspect of the present invention, it is preferable that each magnetic pole portion of the rotor core projects toward the stator. Further, according to an aspect of the present invention, it is preferable that the rotor includes a permanent magnet provided at a portion corresponding to a position between magnetic pole portions in the circumferential direction.

According to an aspect of the present invention, it is preferable that the rotor windings wound around respective magnetic pole portions are electrically isolated from each other, the rectifying element is provided for each of the rotor windings that are electrically isolated, and respective rectifying elements rectify currents that flow through the rotor windings wound around respective magnetic pole portions in such a manner that magnetic poles of the magnetic pole portions alternate in the circumferential direction.

According to an aspect of the present invention, it is preferable that the rotor windings wound around the magnetic pole portions that are adjacent to each other in the circumferential direction are electrically isolated from each other, the rectifying element is provided for each of the rotor windings that are electrically isolated, and respective rectifying elements rectify currents that flow through rotor windings wound around the magnetic pole portions, which are adjacent to each other in the circumferential direction, in such a way as to differentiate directions of the magnetic poles of the neighboring magnetic pole portions. In this case, it is preferable that rotor windings wound around the magnetic pole portions that can function as magnets having the same magnetic pole are electrically connected.

Further, a rotary electric machine according to the present invention includes a stator and a rotor, which are disposed in spaced confronting relationship. The stator includes a stator core on which a plurality of slots are formed and spaced apart from each other in a circumferential direction around a rotor rotational shaft, and stator windings of a plurality of phases that are provided in the slots and wound around the stator core by concentrated winding, in which a rotating magnetic field including harmonics components is formed when AC currents flow through the stator windings. The rotor includes a rotor core, rotor windings wound around the rotor core to generate an induced electromotive force when interlinked with the rotating magnetic field including the harmonics components formed by the stator, and a rectifying element that rectifies currents flowing through the rotor windings in response to generation of the induced electromotive force. The rotor core includes a plurality of magnetic pole portions, which can function as magnets where the magnetic pole is fixed. The magnetic pole portions are magnetized when the currents rectified by the rectifying element flow through the rotor windings. The magnetic pole portions are disposed in spaced confronting relationship with the stator in a state where the magnetic pole portions are spaced apart from each other in the circumferential direction. Further, the width of each magnetic pole portion in the circumferential direction is smaller than a width corresponding to an electric angle of 180°.

According to an aspect of the present invention, it is preferable that the width of each magnetic pole portion in the circumferential direction is substantially equal to a width corresponding to an electric angle of 90°.

According to an aspect of the present invention, it is preferable that the rotor core further includes an annular core portion, the rotor windings are wound around the annular core portion by toroidal winding, and each magnetic pole portion projects from the annular core portion toward the stator.

Further, a rotary electric machine according to the present invention includes a stator and a rotor, which are disposed in spaced confronting relationship. The stator includes a stator core on which a plurality of slots are formed and spaced apart from each other in a circumferential direction around a rotor rotational shaft, and stator windings of a plurality of phases that are provided in the slots and wound around the stator core by concentrated winding, in which a rotating magnetic field including harmonics components is formed when AC currents flow through the stator windings. The rotor includes a rotor core, rotor windings wound around the rotor core to generate an induced electromotive force when interlinked with the rotating magnetic field including the harmonics components formed by the stator, and a rectifying element that rectifies currents flowing through the rotor windings in response to generation of the induced electromotive force. The rotor core includes a plurality of magnetic pole portions that can function as magnets where the magnetic pole is fixed. The magnetic pole portions are magnetized when the currents rectified by the rectifying element flow through the rotor windings. The magnetic pole portions are disposed in spaced confronting relationship with the stator in a state where the magnetic pole portions are spaced apart from each other in the circumferential direction. The rotor windings are a common rotor winding wound around each magnetic pole portion. Further, directions of winding portions of the common rotor winding, which are wound around magnetic pole portions that are adjacent to each other in the circumferential direction, are opposite each other.

According to an aspect of the present invention, it is preferable that the width of the rotor winding wound around each magnetic pole portion is set to be larger than a width corresponding to an electric angle of 90° in the circumferential direction and smaller than a width corresponding to an electric angle of 120°.

Moreover, a driving controller for a rotary electric machine according to the present invention includes the rotary electric machine according to the present invention, and a control unit that controls the phase of AC currents that flow through the stator windings to thereby control the torque of the rotor.

According to the present invention, the electromotive force to be induced by the harmonics components generated by the rotor windings can be efficiently increased. The magnetic flux of the magnet to be generated on each magnetic pole portion by the current that flows through the rotor winding can be efficiently increased. As a result, the torque of the rotor can be efficiently increased. Further, according to the present invention, the electromotive force to be induced by the harmonics components can be generated on the rotor windings without providing any type of winding other than the stator windings on the stator, and without providing any type of winding other than the rotor windings on the rotor. As a result, the type of the winding to be provided on each of the stator and the rotor can be simplified into one type. Thus, the winding structure of a rotary electric machine can be simplified.

BEST MODE FOR CARRYING OUT THE INVENTION

Preferred embodiments of the present invention are described below with reference to the attached drawings.

Figure 1:
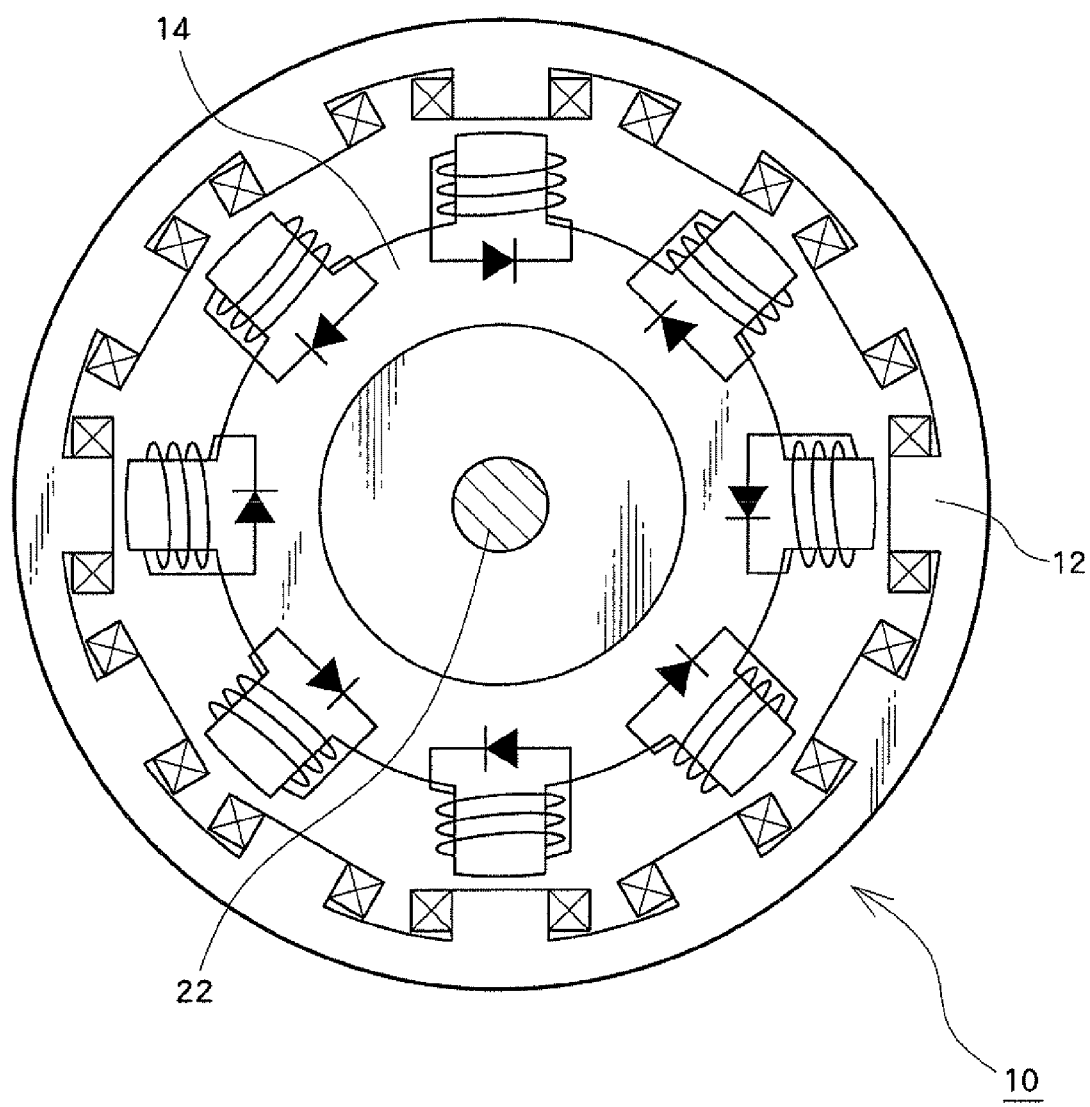
FIG. 1 is a view illustrating a schematic configuration of a rotary electric machine according to an embodiment of the present invention.
Figure 2:
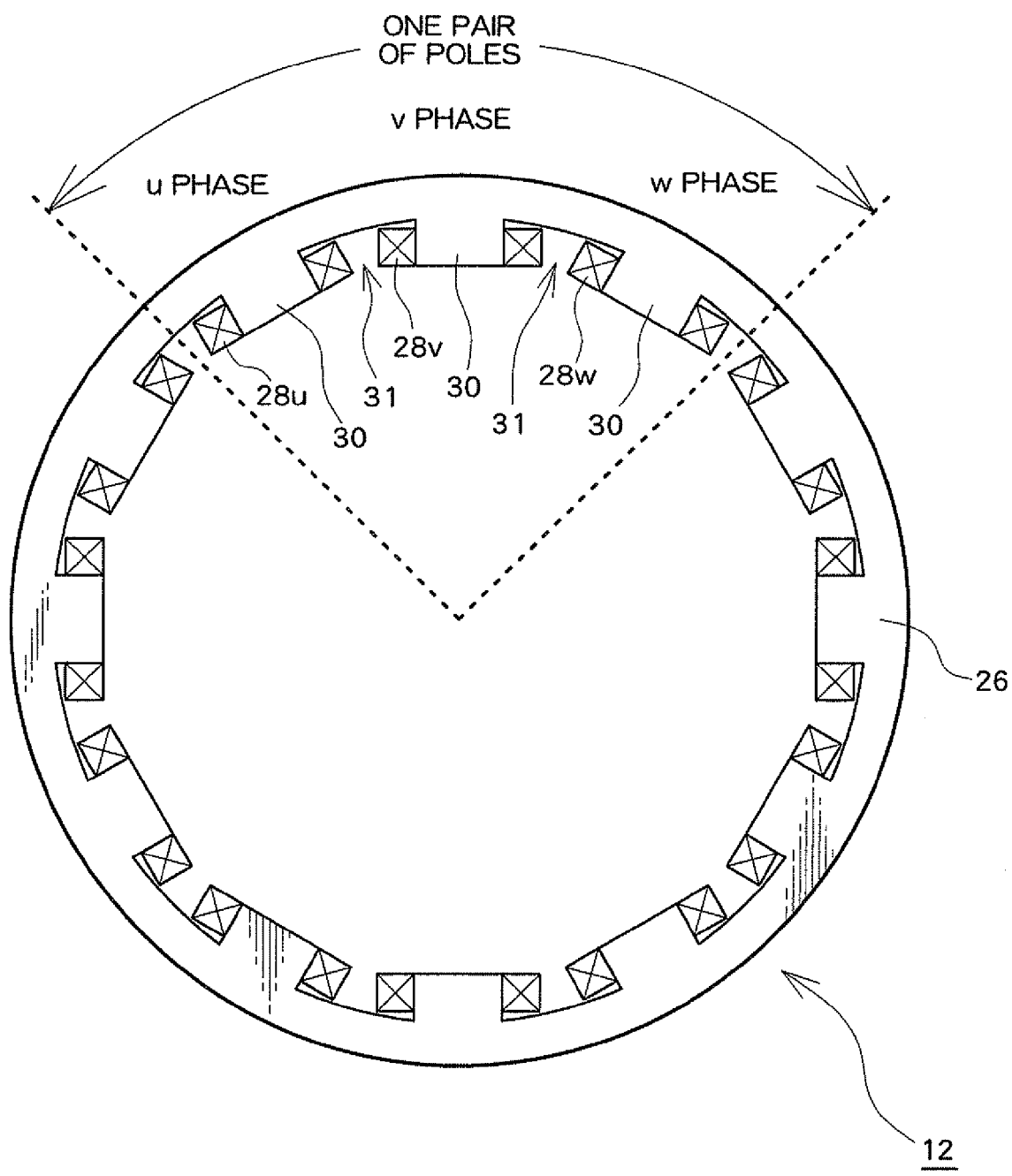
FIG. 2 is a view illustrating a schematic configuration of the rotary electric machine according to an embodiment of the present invention.
Figure 3:
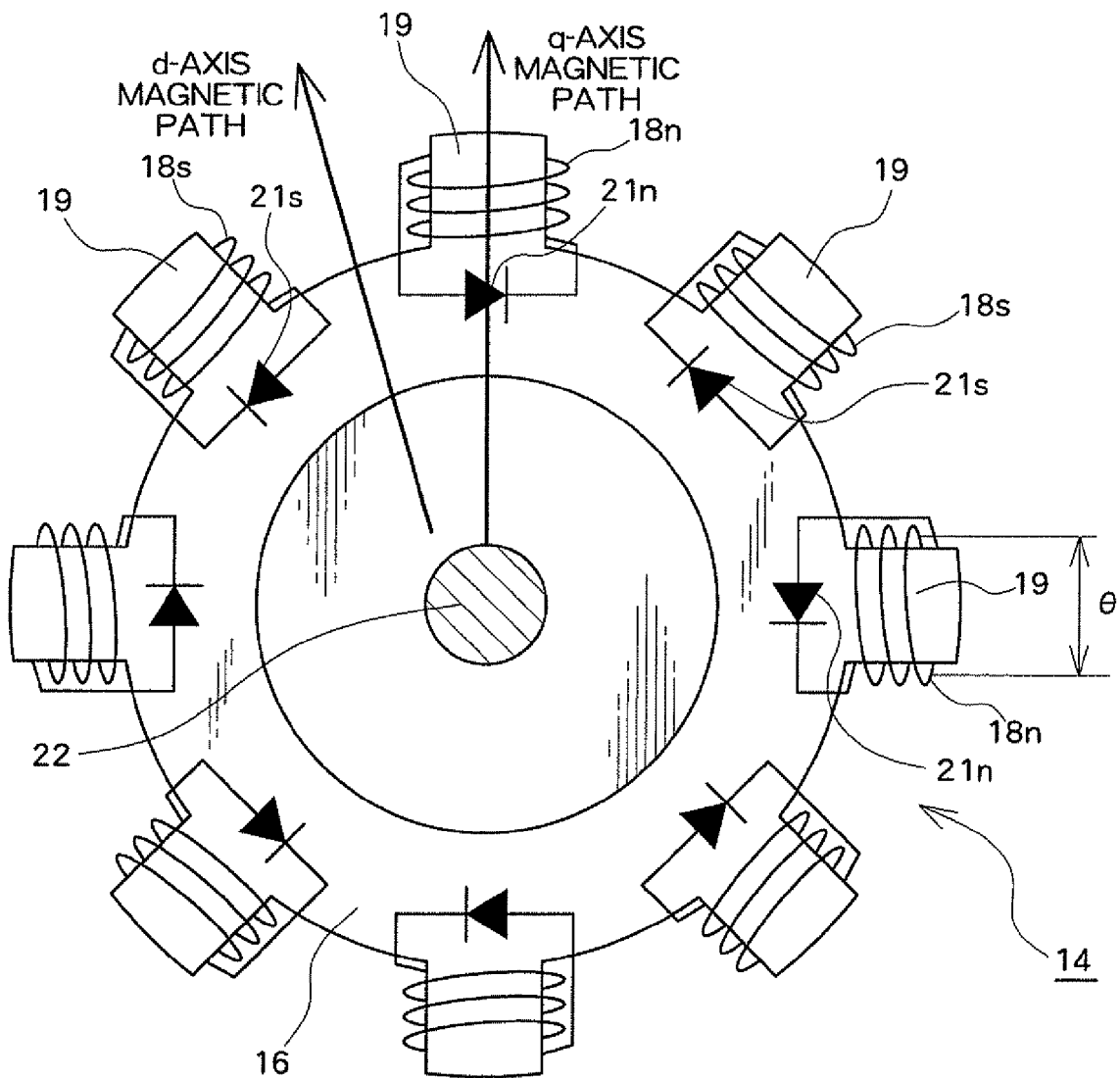
FIG. 3 is a view illustrating a schematic configuration of the rotary electric machine according to an embodiment of the present invention.

FIGS. 1 to 3 are views illustrating a schematic configuration of a rotary electric machine 10 according to an embodiment of the present invention. FIG. 1 schematically illustrates an assembled configuration of a stator 12 and a rotor 14, which are seen from a direction parallel to a rotor rotational shaft 22. FIG. 2 schematically illustrates a configuration of the stator 12. FIG. 3 schematically illustrates a configuration of the rotor 14. The rotary electric machine 10 according to the present embodiment includes the stator 12 fixed to a casing (not illustrated), and the rotor 14 that is rotatable relative to the stator 12 and is disposed in spaced confronting relationship with the stator 12 via a predetermined gap. The example illustrated in FIGS. 1 to 3 is a radial type rotary electric machine, according to which the stator 12 and the rotor 14 are disposed in spaced confronting relationship in a radial direction perpendicular to the rotational shaft 22 (hereinafter, simply referred to as "radial direction"). The rotor 14 is disposed on the inner side of the stator 12 in the radial direction.

The stator 12 includes a stator core 26 and multiple-phase (more specifically, odd-phase (e.g., three-phase)) stator windings 28u, 28v, and 28w that are provided on the stator core 26. The stator core 26 includes a plurality of teeth 30 that project inward in the radial direction (i.e., toward the rotor 14) and are spaced apart from each other in the circumferential direction around the rotational shaft 22 (hereinafter, simply referred to as "circumferential direction"). A slot 31 is formed between two teeth 30. More specifically, a plurality of slots 31 are formed on the stator core 26 along the circumferential direction while being spaced apart from each other. The stator windings 28u, 28v, and 28w of respective phases are located in the slots 31 and are wound around the teeth 30 by concentrated short-pitch winding. The teeth 30 and the stator windings 28u, 28v, and 28w wound around the teeth 30 constitute magnetic poles. When multiple-phase (e.g., three-phase or odd-phase) AC currents flow through the multiple-phase (e.g., three-phase or odd-phase) stator windings 28u, 28v, and 28w, the teeth 30 arrayed in the circumferential direction are sequentially magnetized. Thus, a rotating magnetic field that rotates in the circumferential direction is formed on the teeth 30. The rotating magnetic field formed on the teeth 30 acts on the rotor 14 from the front end surface of the teeth 30. In the example illustrated in FIG. 2, three teeth 30 and a set of three-phase (i.e., u-phase, v-phase, and w-phase) stator windings 28u, 28v, and 28w wound around three teeth 30 configures a pair of poles. As a result, four-pole three-phase stator windings 28u, 28v, and 28w are wound around respective teeth 30. The number of pairs of poles on the stator 12 is four pairs of poles.

The rotor 14 includes a rotor core 16 and a plurality of rotor windings 18n and 18s provided on the rotor core 16. A plurality of salient poles 19 projecting outward (i.e., toward the stator 12) in the radial direction are arranged on the rotor core 16 along the circumferential direction while being spaced apart from each other. Each salient pole 19 opposes the stator 12 (i.e., the teeth 30). A magnetic resistance acting on the rotor 14 when the magnetic flux of the stator 12 (i.e., the teeth 30) passes through the rotor 14 is variable in the rotational direction by the salient pole 19. The magnetic resistance becomes smaller at a position corresponding to each salient pole 19 in the rotational direction. The magnetic resistance becomes larger at a position (e.g., midpoint) between two neighboring salient poles 19 in the rotational direction. The rotor windings 18n and 18s are wound around these salient poles 19 so that the rotor windings 18n and the rotor windings 18s are alternately disposed in the circumferential direction. Each of the rotor windings 18n and 18s has a winding center-axis that corresponds to the radial direction. As illustrated in FIG. 3, a d-axis magnetic path is a magnetic path that passes through the position between two neighboring salient poles 19 where the magnetic resistance is large. A q-axis magnetic path is a magnetic path that passes through the salient pole 19 itself where the magnetic resistance is small. Each of the rotor windings 18n and 18s is disposed around the q-axis magnetic path where the magnetic resistance is small. In the example illustrated in FIG. 3, the rotor windings 18n and 18s wound around respective salient poles 19 are electrically disconnected and isolated (i.e., insulated). Diodes 21n and 21s (i.e., rectifying elements) are connected between two terminal ends of respective rotor windings 18n and 18s that are electrically isolated from each other. Each rotor winding 18n is short-circuited via the diode 21n. Thus, the current that flows through the rotor winding 18n can be rectified by the diode 21n so as to flow in one direction. Similarly, each rotor winding 18s is short-circuited via the diode 21s. Thus, the current that flows through the rotor winding 18s can be rectified by the diode 21s so as to flow in one direction. In the present embodiment, directions of the diodes 21n and 21s connected to the rotor windings 18n and 18s are opposite each other. Therefore, current flowing directions (i.e., rectifying directions regulated by the diodes 21n and 21s) are opposite each other between the rotor windings 18n and the rotor windings 18s that are alternately disposed in the circumferential direction.

When a DC current flows through the rotor winding 18n according to the rectifying direction of the diode 21n, the salient pole 19 around which the rotor winding 18n is wound can be magnetized. Therefore, the salient pole 19 can function as a magnet where the magnetic pole is fixed (i.e., a magnetic pole portion). Similarly, when a DC current flows through the rotor winding 18s according to the rectifying direction of the diode 21s, the salient pole 19 around which the rotor winding 18s is wound can be magnetized. Therefore, the salient pole 19 can function as a magnet where the magnetic pole is fixed (i.e., a magnetic pole portion). The directions of the DC currents that flow through the rotor winding 18n and the rotor winding 18s, which are adjacent to each other in the circumferential direction, are opposite each other. Therefore, magnetized directions of two salient poles 19, which are adjacent to each other in the circumferential direction, are opposite each other. Magnets having mutually different magnetic poles can be formed on two salient poles 19. The magnetic poles of the salient poles 19 alternate in the circumferential direction. In the present embodiment, an N-pole is formed on the salient pole 19 around which the rotor winding 18n is wound. Further, an S-pole is formed on the salient pole 19 around which the rotor winding 18s is wound. To this end, the setting for the diodes 21n and 21s is performed to adjust the current rectifying directions of the rotor windings 18n and 18s. In this manner, the magnets are formed on respective salient poles 19 so that the N-poles and the S-poles are alternately arrayed in the circumferential direction. Further, two salient poles 19 (i.e., the N-pole and the S-pole) that are adjacent to each other in the circumferential direction can constitute a pair of poles. According to the example illustrated in FIG. 3, the rotor 14 includes a total of eight salient poles 19. The number of pairs of poles on the rotor 14 is four pairs of poles. Therefore, according to the example illustrated in FIGS. 1 to 3, the number of pairs of poles on the stator 12 is four pairs of poles while the number of pairs of poles on the rotor 14 is four pairs of poles. In this respect, the number of pairs of poles on the stator 12 is equal to the number of pairs of poles on the rotor 14. However, the number of pairs of poles on the stator 12 and the number of pairs of poles on the rotor 14 can be any number other than four pairs of poles.

In the present embodiment, the width of each salient pole 19 in the circumferential direction is set to be shorter than a width corresponding to an electric angle of 180° of the rotor 14. Further, the width θ of respective rotor windings 18n and 18s in the circumferential direction is set to be shorter than the width corresponding to an electric angle of 180° of the rotor 14. The rotor windings 18n and 18s are wound around the salient poles 19 by short-pitch winding. Regarding the width θ of respective rotor windings 18n and 18s, it may be useful to regulate the distance between the centers of the cross sections of the rotor windings 18n and 18s in consideration of the cross-sectional areas of respective rotor windings 18n and 18s. More specifically, the width θ of respective rotor windings 18n and 18s can be expressed using an average value obtainable from a gap between inner circumferential surfaces of the rotor windings 18n and 18s and a gap between outer circumferential surfaces of the rotor windings 18n and 18s. The electric angle of the rotor 14 can be expressed using a value that is obtainable by multiplying the mechanical angle of the rotor 14 by the number of pairs of poles p (p=4 according to the example illustrated in FIG. 3) of the rotor 14 (namely, electric angle=mechanical angle×p). Therefore, the width θ of respective rotor windings 18n and 18s in the circumferential direction satisfies the following formula (1) when "r" represents a distance from the center of the rotational shaft 22 to the rotor windings 18n and 18s.

$$\theta < \pi \times r/p \quad (1)$$

In the present embodiment, the magnetomotive force that causes the stator 12 to generate the rotating magnetic field has a distribution that is not similar to a sine wave distribution (including only the basic wave), because of the layout of the stator windings 28u, 28v, and 28w of respective phases and the shape of the stator core 26 that includes the teeth 30 and the slots 31. The distribution of the magnetomotive force that causes the stator 12 to generate the rotating magnetic field includes harmonics components. Particularly, according to the concentrated winding, the stator windings 28u, 28v, and 28w of respective phases are not overlapped with each other. Therefore, the harmonics components appearing in the magnetomotive force distribution of the stator 12 increase in amplitude level. Further, for example, in a case where the stator windings 28u, 28v, and 28w are three-phase concentrated windings, input electric frequency tertiary components increase as harmonics components increase in amplitude level. In the following description, the harmonics components that may be caused in the magnetomotive force due to the layout of the stator windings 28u, 28v, and 28w and the shape of the stator core 26 are referred to as space harmonics.

The rotating magnetic field (basic wave component) formed on the teeth 30 interacts with the rotor 14 when three-phase AC currents flow through the three-phase stator windings 28u, 28v, and 28w. Correspondingly, the salient poles 19 are magnetically attracted by the rotating magnetic field of the teeth 30 in such a manner that the magnetic resistance of the rotor 14 becomes smaller. Accordingly, a torque (i.e., a reluctance torque) acts on the rotor 14. The rotor 14 rotates in synchronization with the rotating magnetic field (basic wave component) produced by the stator 12.

Further, when the rotating magnetic field produced by the teeth 30, which includes space harmonics components, interlinks with the rotor windings 18n and 18s of the rotor 14, the rotor windings 18n and 18s are subjected to magnetic flux variations that are caused by the space harmonics components at a frequency that is different from the rotation frequency (i.e., basic wave component of the rotating magnetic field) of the rotor 14. The above-described magnetic flux variations cause respective rotor windings 18n and 18s to produce induced electromotive forces. Currents that flow through the rotor windings 18n and 18s in accordance with the generation of the induced electromotive force are rectified by respective diodes 21n and 21s. Therefore, these currents flow in one direction (as DC currents). Further, when the DC currents rectified by respective diodes 21n and 21s flow through the rotor windings 18n and 18s, the salient poles 19 are magnetized correspondingly. Accordingly, magnets each having a magnetic pole (either the N-pole or the S-pole) are produced on the salient poles 19. As described above, the current rectifying directions of the rotor windings 18n and 18s, which are regulated by the diodes 21n and 21s, are opposite each other. Therefore, the magnets produced on respective salient poles 19 are arranged in such a manner that N-poles and S-poles are alternately disposed in the circumferential direction. Further, when the magnetic field of each salient pole 19 (i.e., the magnet where the magnetic pole is fixed) interacts with the rotating magnetic field (i.e., basic wave component) of the teeth 30, attractive and repulsive functions are generated. The electromagnetic interaction (i.e., the attractive and repulsive functions) between the rotating magnetic field (basic wave component) of the teeth 30 and the magnetic field of the salient poles 19 (magnets) generates a torque (i.e., a torque that corresponds to a magnetic torque) that acts on the rotor 14. Therefore, the rotor 14 rotates in synchronization with the rotating magnetic field (basic wave component) formed by the stator 12. As described above, the rotary electric machine 10 according to the present embodiment can function as a motor that generates motive power (i.e., mechanical power) from the rotor 14 when electric power is supplied to the stator windings 28u, 28v, and 28w. Meanwhile, the rotary electric machine 10 according to the present embodiment can function as an electric power generator that generates electric power from the stator windings 28u, 28v, and 28w when the rotor 14 generates motive power.

Figure 4A:
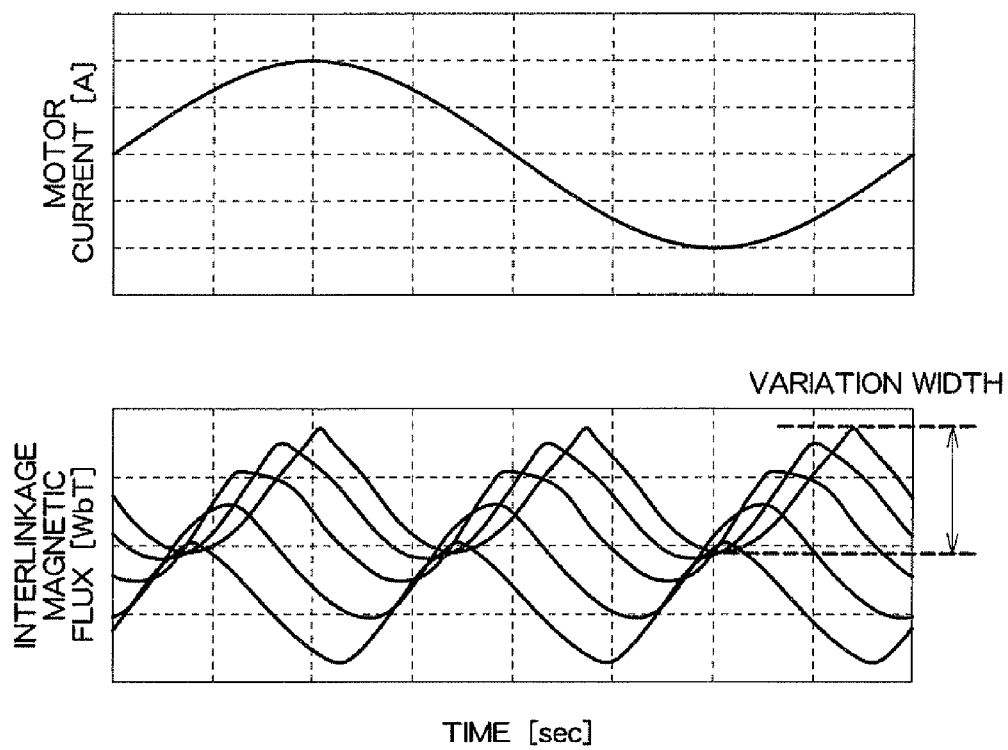
FIG. 4A illustrates a calculation result of a flux linkage to be caused by space harmonics that interacts with rotor windings.
Figure 4B:
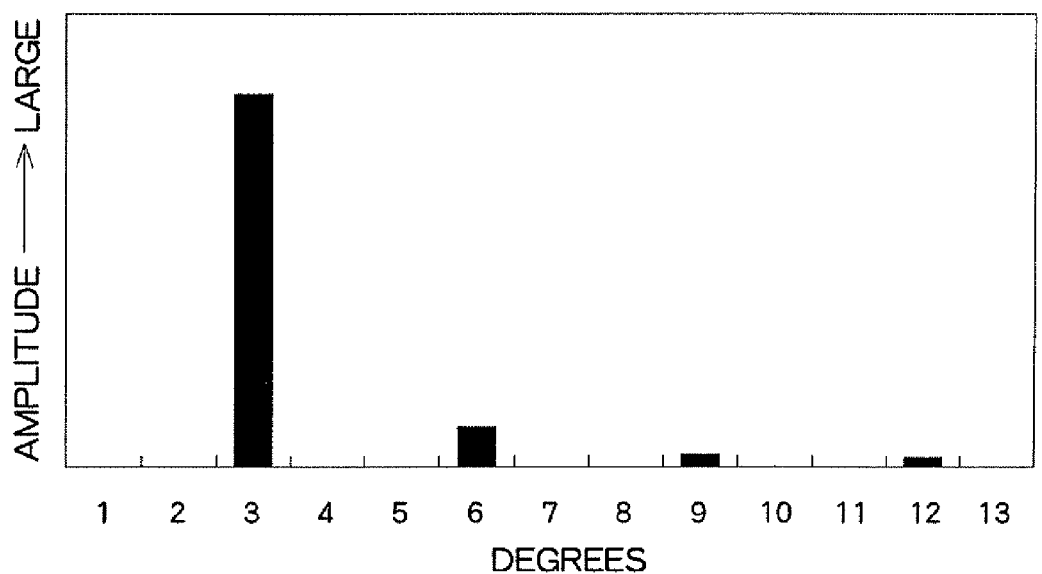
FIG. 4B illustrates a calculation result of a flux linkage to be caused by space harmonics that interacts with rotor windings.

FIGS. 4A and 4B illustrate calculation results of the flux linkage interacting with the rotor windings 18n and 18s that may be generated by the space harmonics. Each waveform illustrated in FIG. 4A represents a waveform of the flux linkage that interacts with rotor windings 18n and 18s when the phase (i.e., the current vector phase relative to the rotor position) of respective AC currents flowing through the stator windings 28u, 28v, and 28w is changed. Further, FIG. 42 represents a result of frequency analysis performed on the waveform of the flux linkage that interacts with the rotor windings 18n and 18s. From the frequency analysis result illustrated in FIG. 42, it is understood that input electric frequency tertiary components are mainly generated. As illustrated in FIG. 4A, the flux linkage waveform does not substantially change even when the current vector phase is changed, although the bias of the flux linkage is variable.

Figure 5:
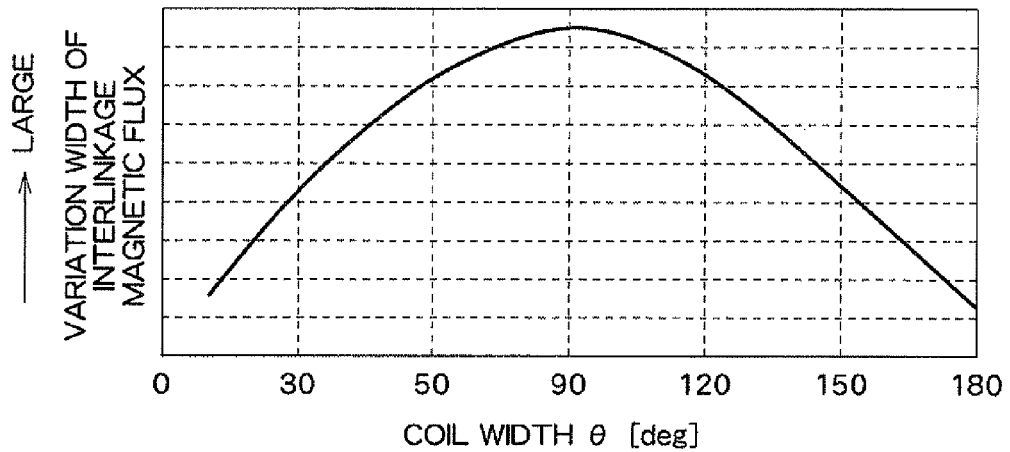
FIG. 5 illustrates a calculation result of the amplitude of a flux linkage that interacts with rotor windings, which can be obtained by changing a circumferential width θ of the rotor winding.

The amplitude (i.e. variation width) of a flux linkage that interacts with the rotor windings 18n and 18s is influenced by the width θ of respective rotor windings 18n and 18s in the circumferential direction. FIG. 5 illustrates a calculation result of the amplitude (i.e., variation width) of a flux linkage that interacts with the rotor windings 18n and 18s, which can be obtained by changing the width θ of the rotor windings 18n and 18s in the circumferential direction. In FIG. 5, the coil width θ is expressed using a value converted into an electric angle. As illustrated in FIG. 5, the variation width of the flux linkage that interacts with the rotor windings 18n and 18s increases when the coil width θ decreases from the angle 180°. Therefore, the amplitude of the flux linkage generated by the space harmonics can be increased by setting the coil width θ to be smaller than the angle 180°; more specifically, by winding the rotor windings 18n and 18s by short-pitch winding, as compared with the case of full-pitch winding.

Accordingly, in the present embodiment, the induced electromotive forces to be generated by the space harmonics on the rotor windings 18n and 18s can be efficiently increased by setting the width of each salient pole 19 to be smaller than the width corresponding to an electric angle of 180° in the circumferential direction and further by winding the rotor windings 18n and 18s around the salient poles 19 by short-pitch winding. Therefore, the present embodiment can efficiently generate induced currents that flow through the rotor windings 18n and 18s by utilizing the space harmonics that do not substantially contribute to the generation of torque. The present embodiment can efficiently increase the magnetic fluxes of the magnets on the salient poles 19 that are generated by the induced currents. As a result, the torque that acts on the rotor 14 can be efficiently increased. Further, the present embodiment can efficiently generate the electromotive forces to be induced by the space harmonics on the rotor windings 18n and 18s without providing any type of winding (e.g., the exciting winding or the reactor discussed in the Patent Documents 1 to 4) other than the stator windings 28u, 28v, and 28w on the stator 12. Therefore, the windings to be provided on the stator 12 can be simplified into only one type (i.e., only the stator windings 28u, 28v, and 28w). As a result, the winding structure of the stator 12 can be simplified. Further, by rectifying the induced current to be caused by the induced electromotive force with the diodes 21n and 21s, the magnet where the magnetic pole is fixed can be generated on the rotor 14 (i.e., each salient pole 19) without providing any type of winding (e.g., the auxiliary field winding discussed in the Patent Documents 1 and 2) other than the rotor windings 18n and 18s on the rotor 14. Therefore, the windings to be provided on the rotor 14 can be simplified into only one type (only the rotor windings 18n and 18s). The winding structure of the rotor 14 can be simplified. As a result, the winding structure of the rotary electric machine 10 can be simplified, and the rotary electric machine 10 can be downsized.

Further, as illustrated in FIG. 5, the amplitude of the flux linkage generated by the space harmonics can be maximized when the coil width θ is 90°. Accordingly, in the present embodiment, to further increase the amplitude of the flux linkage generated by the space harmonics that interacts with the rotor windings 18n and 18s, the width θ of the rotor windings 18n and 18s in the circumferential direction is preferably equal to (or substantially equal to) the width corresponding to an electric angle of 90° of the rotor 14. Therefore, it is preferable that the width θ of the rotor windings 18n and 18s in the circumferential direction satisfies (or substantially satisfies) the following formula (2).

$$\theta = \pi \times r/(2 \times p) \qquad (2)$$

As described above, the induced electromotive forces to be generated by the space harmonics on the rotor windings 18n and 18s can be maximized by setting the width θ of the rotor windings 18n and 18s in the circumferential direction equal to (or substantially equal to) the width corresponding to the electric angle of 90°. Therefore, the present embodiment can most efficiently increase the magnetic fluxes of the magnets on the salient poles 19, which are generated by the induced currents. As a result, the torque acting on the rotor 14 can be increased further efficiently.

Figure 6:
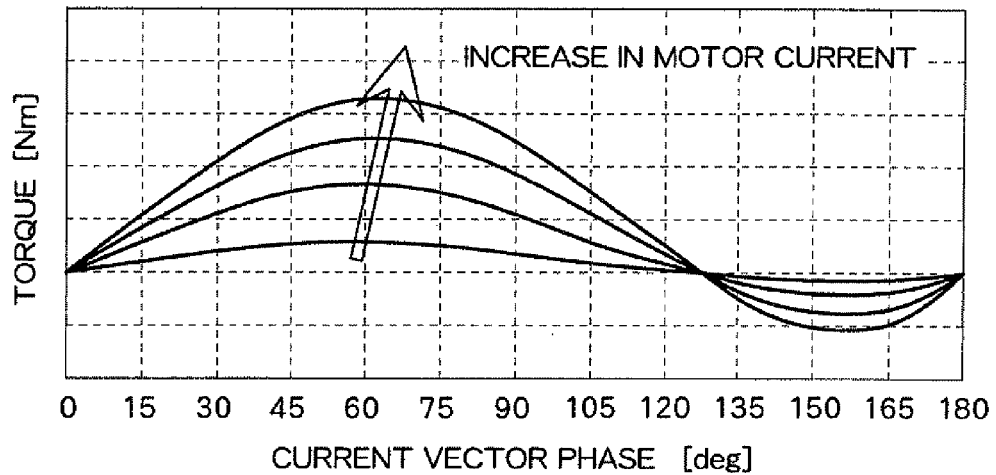
FIG. 6 illustrates a calculation result of the torque of a rotor, which can be obtained by changing the phase of an AC current that flows through a stator winding.
Figure 7:
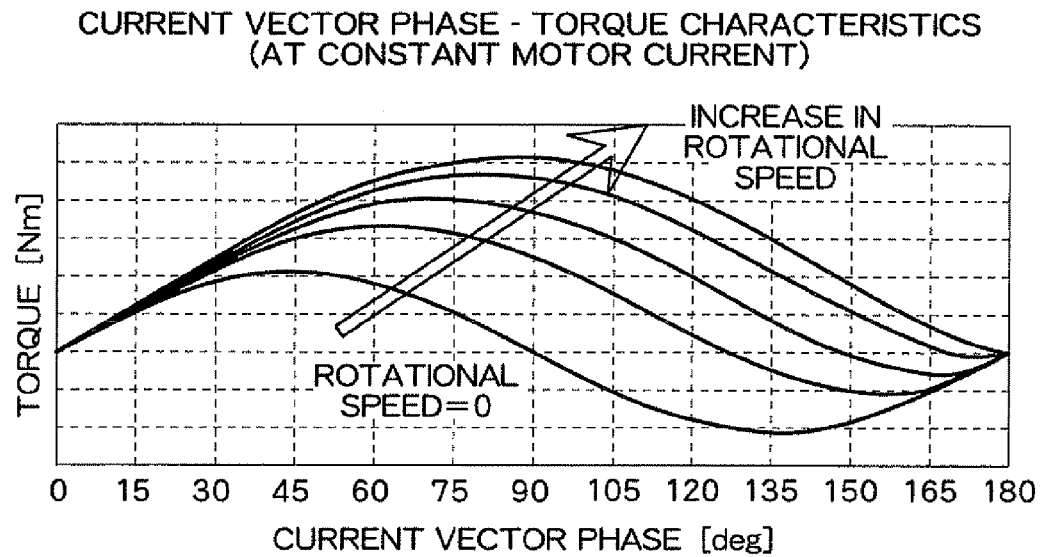
FIG. 7 illustrates a calculation result of the torque of a rotor, which can be obtained by changing the phase of an AC current that flows through a stator winding.

FIGS. 6 and 7 illustrate calculation results of the torque of the rotor 14, which can be obtained by changing the phase (i.e., current vector phase relative to the rotor position) of respective AC currents that flow through the stator windings 28u, 28v, and 28w. FIG. 6 illustrates a calculation result of the torque in a case where the amplitude (i.e., current amplitude) and the phase (i.e., current vector phase) of respective AC currents flowing through the stator windings 28u, 28v, and 28w are changed while the rotational speed of the rotor 14 is maintained at a constant speed. FIG. 7 illustrates calculation results of the torque in a case where the current vector phase and the rotational speed of the rotor 14 are changed while the current amplitude is maintained at a constant level. As understood from FIGS. 6 and 7, if the current vector phase changes, the torque of the rotor 14 changes correspondingly. Therefore, the torque of the rotor 14 can be controlled by controlling the current vector phase (i.e., the phases of the AC currents that flow through the stator windings 28u, 28v, and 28w). Further, as understood from FIG. 6, if the current amplitude changes, the torque of the rotor 14 changes correspondingly. Therefore, the torque of the rotor 14 can be controlled by controlling the current amplitude (i.e., the amplitude of the AC currents that flow through the stator windings 28u, 28v, and 28w). Further, as understood from FIG. 7, if the rotational speed of the rotor 19 changes, the torque of the rotor 14 changes correspondingly. Therefore, the torque of the rotor 14 can be controlled by controlling the rotational speed of the rotor 14.

Figure 8:
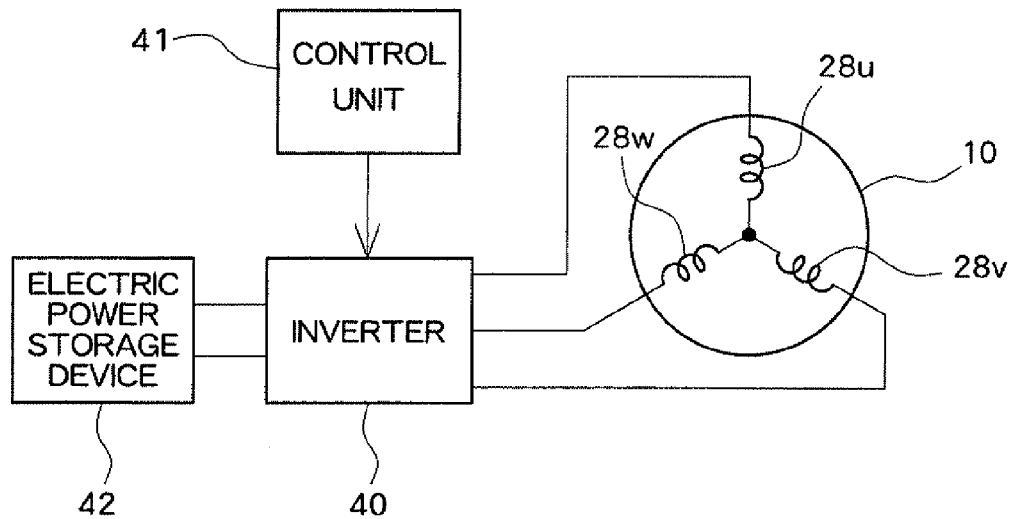
FIG. 8 is a view illustrating a schematic configuration of a driving controller for the rotary electric machine according to an embodiment of the present invention.

FIG. 8 illustrates a schematic configuration of a driving controller for the rotary electric machine 10 according to the present embodiment. An electric power storage device 42 is a DC power source having the capability of charging and discharging electric power. The electric power storage device 42 is, for example, constituted by a secondary battery. An inverter 40 includes switching elements (not illustrated) that perform switching operations for converting the DC power of the electric power storage device 42 into a plurality of phases of alternating currents (e.g., three-phase alternating currents). Thus, the inverter 40 can supply alternating currents to respective phases of the stator windings 28u, 28v, and 28w. A control unit 41 controls the torque of the rotor 14 by controlling the phase (current vector phases) of respective AC currents that flow through the stator windings 28u, 28v, and 28w. To this end, the control unit 41 controls the switching operation of respective switching elements of the inverter 40. However, to control the torque of the rotor 14, the control unit 41 can control the amplitude of the AC currents that flow through the stator windings 28u, 28v, and 28w, or can control the rotational speed of the rotor 14.

Another example configuration of the rotary electric machine 10 according to the present embodiment is described below.

Figure 9:
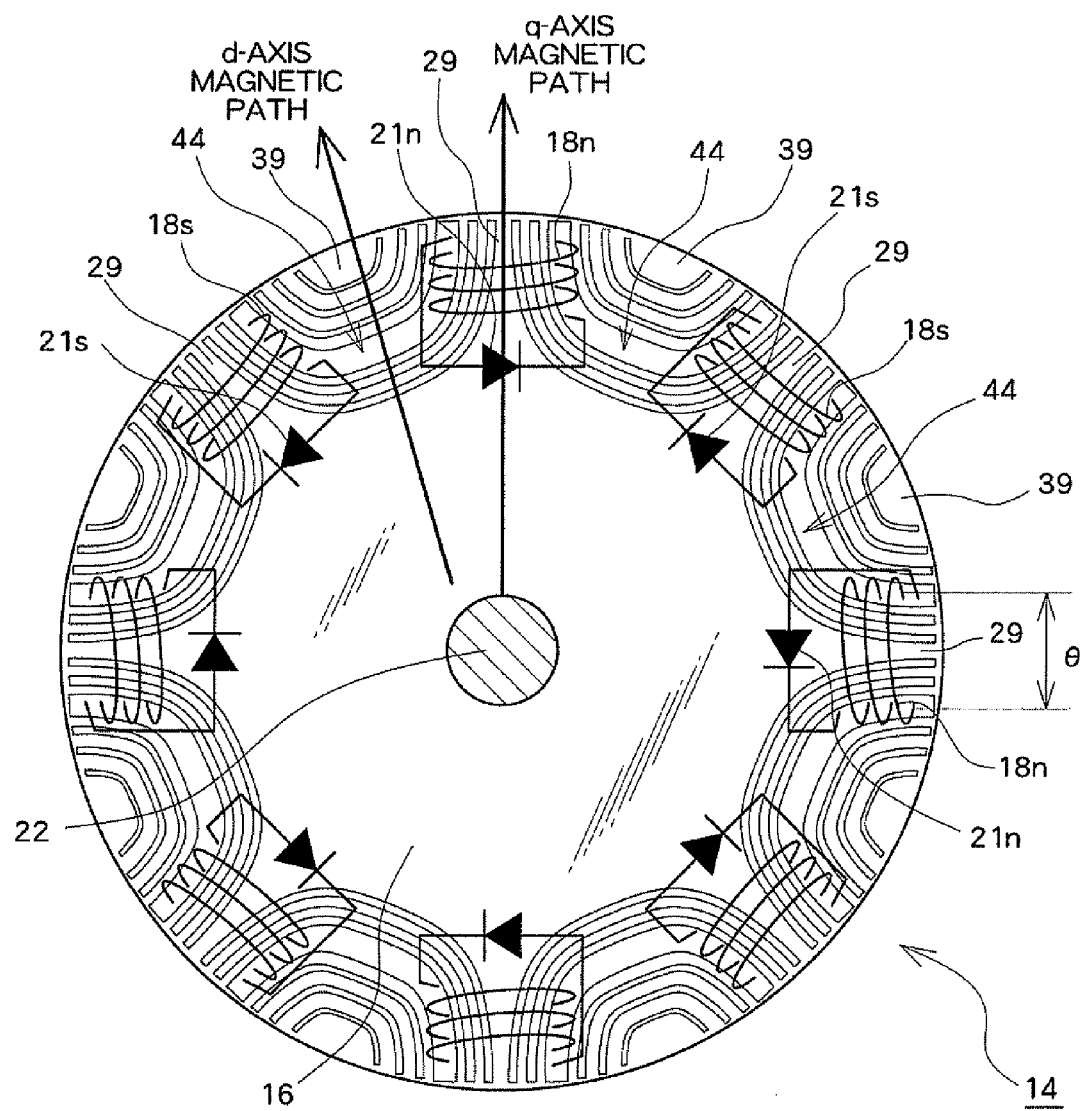
FIG. 9 is a view illustrating another schematic configuration of a rotary electric machine according to an embodiment of the present invention.

In the present embodiment, for example, as illustrated in FIG. 9, the magnetic resistance of the rotor 14 can be changed in the rotational direction by forming slits (i.e., gaps) 44 on the rotor core 16. As illustrated in FIG. 9, the rotor core 16 includes d-axis magnetic path portions 39 where the magnetic path has a larger magnetic resistance and q-axis magnetic path portions 29 where the magnetic path has a smaller magnetic resistance compared to that of the d-axis magnetic path portions 39. Formation of the slits 44 realizes an arrangement of the d-axis magnetic path portions 39 and the q-axis magnetic path portions 29 that are alternately disposed in the circumferential direction, in a state where the d-axis magnetic path portions 39 and the q-axis magnetic path portions 29 are disposed in spaced confronting relationship with the stator 12 (i.e., the teeth 30). Each d-axis magnetic path portion 39 is positioned between two q-axis magnetic path portions 29 in the circumferential direction. The rotor windings 18n and 18s are disposed in the slits 44 and are wound around the q-axis magnetic path portions 29 where the magnetic resistance is small. According to the example configuration illustrated in FIG. 9, the rotating magnetic field that includes the space harmonics components formed by the stator 12 interlinks with the rotor windings 18n and 18s. Accordingly, DC currents rectified by the diodes 21n and 21s flow through the rotor windings 18n and 18s. The q-axis magnetic path portions 29 are magnetized. As a result, each q-axis magnetic path portion 29 can function as a magnet where the magnetic pole is fixed (i.e., a magnetic pole portion). In this case, the induced electromotive forces generated by the space harmonics on the rotor windings 18n and 18s can be efficiently increased by setting the width of each q-axis magnetic path portion 29 in the circumferential direction (i.e., the width G of respective rotor windings 18n and 18s) to be shorter than the width corresponding to electric angle 180° of the rotor 14, and further by winding the rotor windings 18n and 18s around the q-axis magnetic path portions 29 by short-pitch winding. Further, to maximize the induced electromotive forces generated by the space harmonics on the rotor windings 18n and 18s, the width θ of the rotor windings 18n and 18s in the circumferential direction is preferably set equal to (or substantially equal to) the width corresponding to an electric angle of 90° of the rotor 14.

Figure 10:
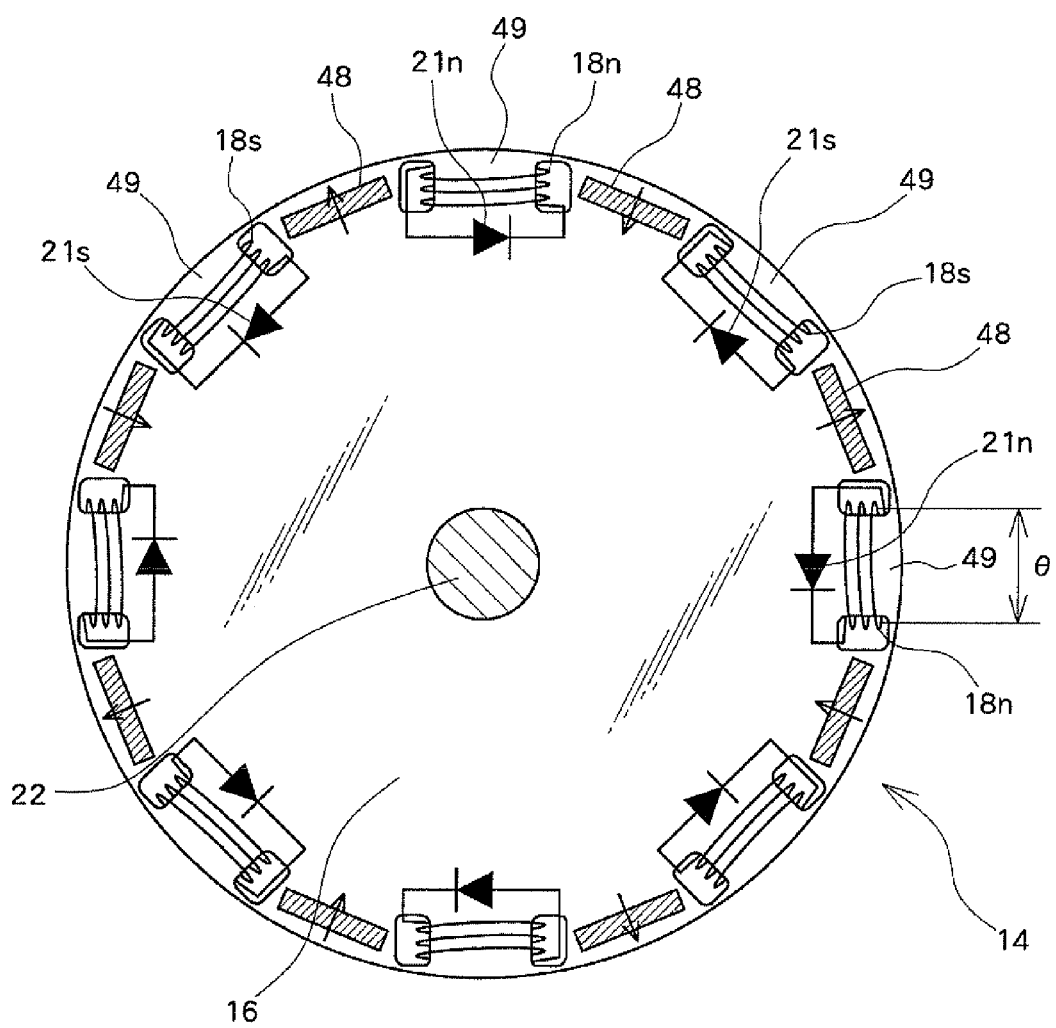
FIG. 10 is a view illustrating another schematic configuration of a rotary electric machine according to an embodiment of the present invention.

Further, in the present embodiment, permanent magnets 48 can be disposed on the rotor core 16, for example, as illustrated in FIG. 10. According to the example configuration illustrated in FIG. 10, a plurality of magnetic pole portions 49 that can function as magnets where the magnetic pole is fixed are arranged along the circumferential direction in a mutually spaced state and are disposed in spaced confronting relationship with the stator 12 (i.e. the teeth 30). The rotor windings 18n and 18s are wound around the magnetic pole portions 49. Each permanent magnet 48 is positioned at a portion corresponding to a position (e.g., midpoint) between two neighboring magnetic pole portions 49 in the circumferential direction and is disposed in spaced confronting relationship with the stator 12 (i.e., the teeth 30). The above-described permanent magnets 48 can be embedded in the rotor core 16 or can be exposed on the surface (outer circumferential surface) of the rotor core 16. Further, in a case where the permanent magnets 48 are embedded in the rotor core 16, the permanent magnets 48 can be configured to form a V-shaped arrangement. According to the example configuration illustrated in FIG. 10, the rotating magnetic field including the space harmonics components formed by the stator 12 interlinks with respective rotor windings 18n and 18s. The DC currents rectified by the diodes 21n and 21s flow through the rotor windings 18n and 18s, and each magnetic pole portion 49 is magnetized. As a result, each magnetic pole portion 49 can function as a magnet where the magnetic pole is fixed. In this case, the induced electromotive forces to be generated by the space harmonics on the rotor windings 18n and 18s can be efficiently increased by setting the width of each magnetic pole portion 49 in the circumferential direction (i.e., the width θ of respective rotor windings 18n and 18s) to be shorter than the width corresponding to electric angle 180° of the rotor 14, and further by winding the rotor windings 18n and 18s around the magnetic pole portions 49 by short-pitch winding. Further, to maximize the induced electromotive forces to be generated by the space harmonics on the rotor windings 18n and 18s, the width θ of the rotor windings 18n and 18s in the circumferential direction is preferably set equal to (or substantially equal to) the width corresponding to an electric angle of 90° of the rotor 14.

Figure 11:
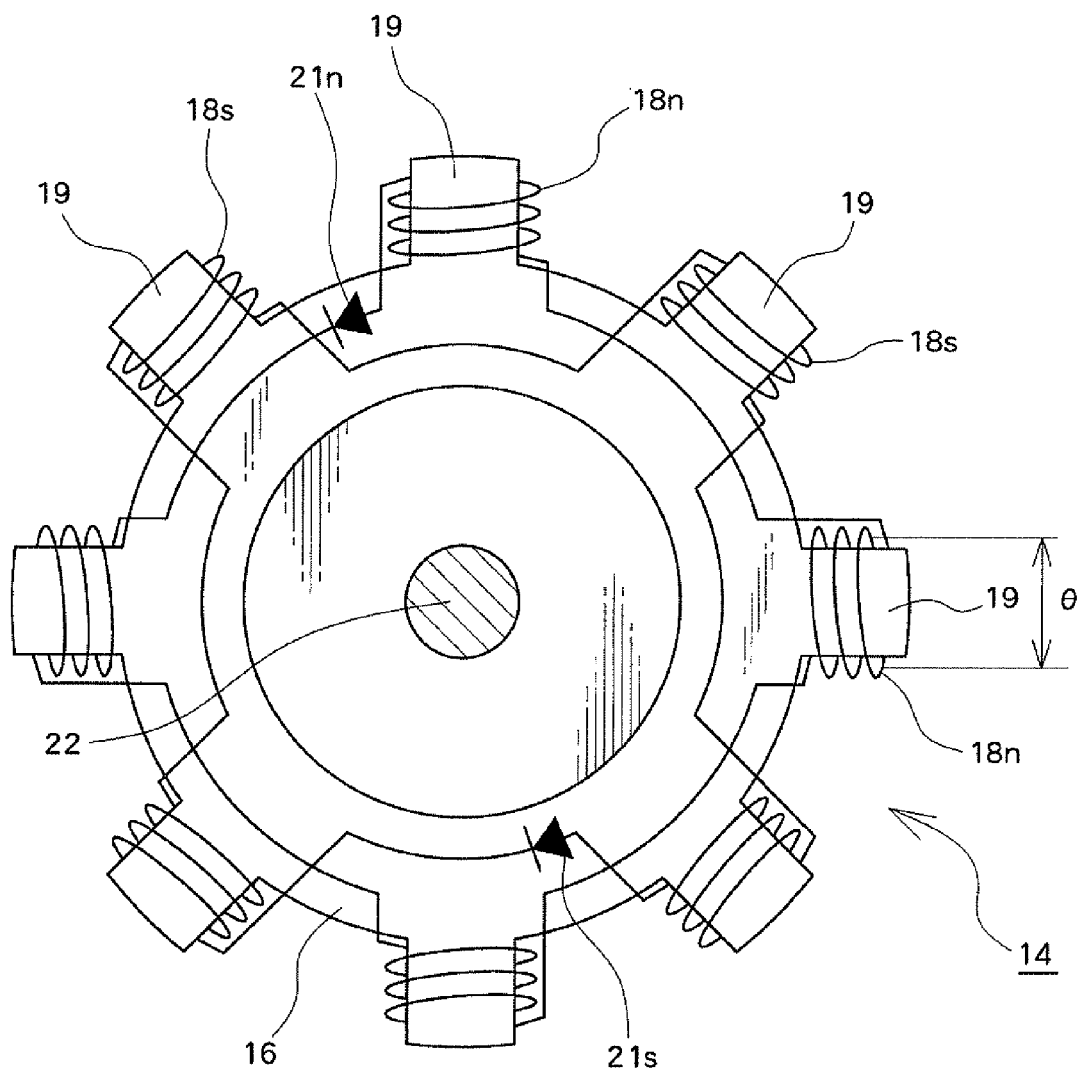
FIG. 11 is a view illustrating another schematic configuration of a rotary electric machine according to an embodiment of the present invention.

Further, in the present embodiment, for example, as illustrated in FIG. 11, the rotor windings 18n disposed on every other pole in the circumferential direction can be connected to each other so as to be electrically connected in series. The rotor windings 18s disposed on every other pole in the circumferential direction can be connected to each other so as to be electrically connected in series. More specifically, the rotor windings 18n wound around the salient poles 19 that can function as magnets having the same magnetic pole (e.g., N-pole) can be electrically connected to each other as a serial winding. The rotor windings 18s wound around the salient poles 19 that can function as magnets having the same magnetic pole (e.g., S-pole) can be electrically connected to each other as a serial winding. However, the rotor windings 18n and 18s wound around the salient poles 19 that are adjacent to each other in the circumferential direction (i.e., on which magnets having mutually different magnetic poles are formed) are electrically isolated from each other. Two diodes 21n and 21s (i.e., two diodes) are provided for the rotor windings 18n and 18s that are electrically isolated from each other. The diode 21n rectifies the current that flows through the rotor windings 18n that are electrically connected as a serial winding. The diode 21s rectifies the current that flows through the rotor windings 18s that are electrically connected as a serial winding. In this case, it is desired to form the magnets having magnetic poles that are mutually different between the salient poles 19 around which the rotor windings 18n are wound and the salient poles 19 around which the rotor windings 18s are wound (i.e., between the salient poles 19 that are adjacent to each other in the circumferential direction). To this end, the current-rectifying directions of the rotor windings 18n and 18s regulated by the diodes 21n and 21s are set to be opposite each other. According to the example configuration illustrated in FIG. 11, the total number of the diodes 21n and 21s can be reduced to only two.

Figure 12:
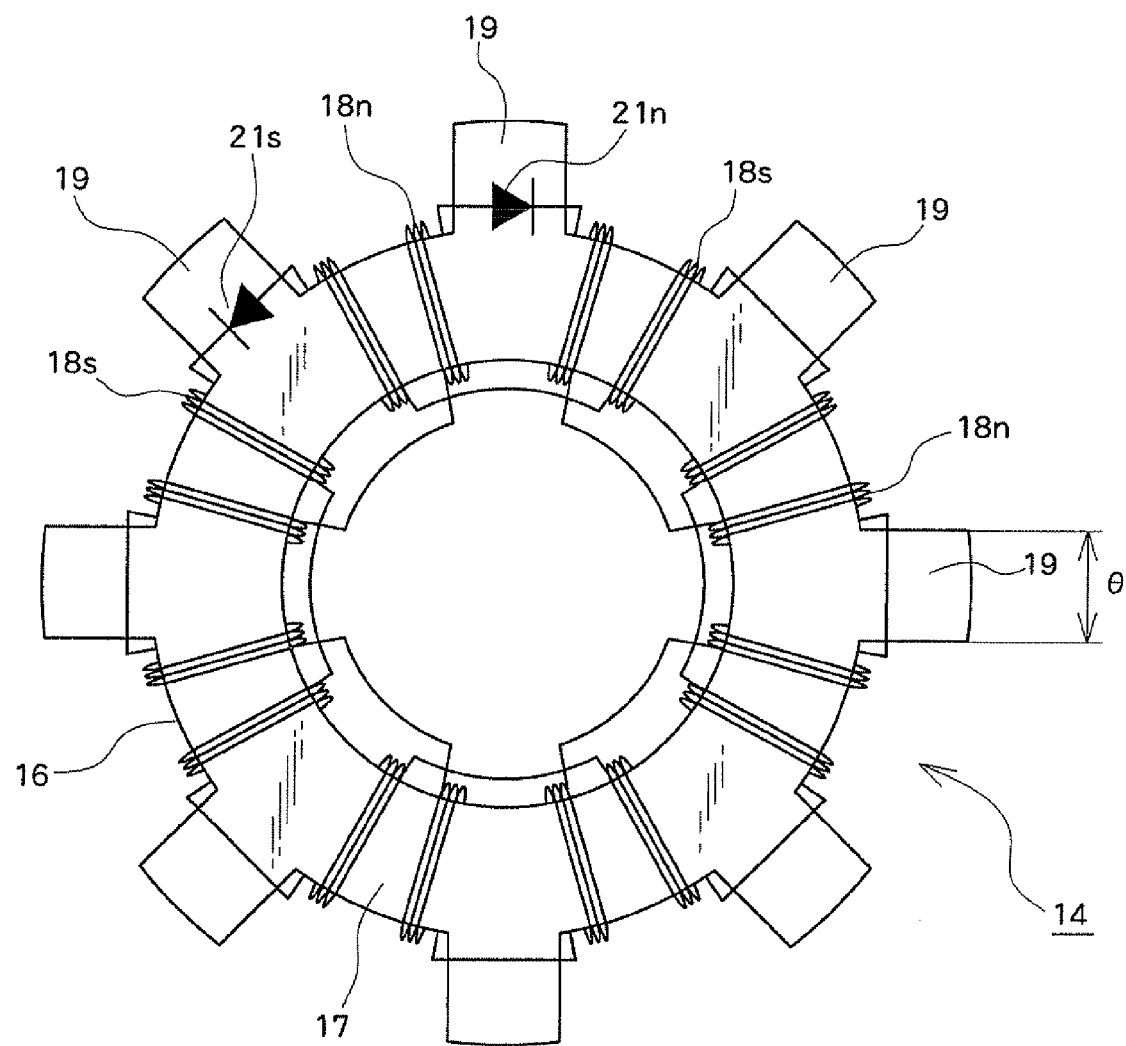
FIG. 12 is a view illustrating another schematic configuration of a rotary electric machine according to an embodiment of the present invention.

Further, in the present embodiment, for example, as illustrated in FIG. 12, the rotor windings 18n and 18s can be wound by toroidal winding. According to the example configuration illustrated in FIG. 12, the rotor core 16 includes an annular core portion 17 and salient poles 19 that project outward from the annular core portion 17 in the radial direction (i.e., toward the stator 12). Respective rotor windings 18n and 18s are wound around a predetermined position of the annular core portion 17, which is close to each salient pole 19, by toroidal winding. According to the example configuration illustrated in FIG. 12, the rotating magnetic field that includes the space harmonics components formed by the stator 12 interlinks with the rotor windings 18n and 18s. DC currents rectified by the diodes 21n and 21s flow through the rotor windings 18n and 18s and magnetize respective salient poles 19. As a result, the salient poles 19 positioned in the vicinity of the rotor windings 18n can function as N-poles. The salient poles 19 positioned in the vicinity of the rotor windings 18s can function as S-poles. In this case, the induced electromotive forces to be generated by the space harmonics on the rotor windings 18n and 18s can be efficiently increased by setting the width θ of each salient pole 19 in the circumferential direction to be shorter than the width corresponding to an electric angle of 180° of the rotor 14. Further, to maximize the induced electromotive forces to be generated by the space harmonics on the rotor windings 18n and 18s, the width θ of each salient pole 19 in the circumferential direction is preferably set equal to (or substantially equal to) the width corresponding to an electric angle of 90° of the rotor 14. Similar to the example configuration illustrated in FIG. 11, in the example illustrated in FIG. 12, the rotor windings 18n and 18s that are adjacent to each other in the circumferential direction are electrically isolated from each other. The rotor windings 18n disposed on every other pole in the circumferential direction are electrically connected to form a serial winding. The rotor windings 18s disposed on every other pole in the circumferential direction are electrically connected to form a serial winding. However, even in the example of the rotor windings 18n and 18s that are wound by toroidal winding, similar to the example configuration illustrated in FIG. 3, the rotor windings 18n and 18s wound around the salient poles 19 can be electrically isolated from each other.

Figure 13:
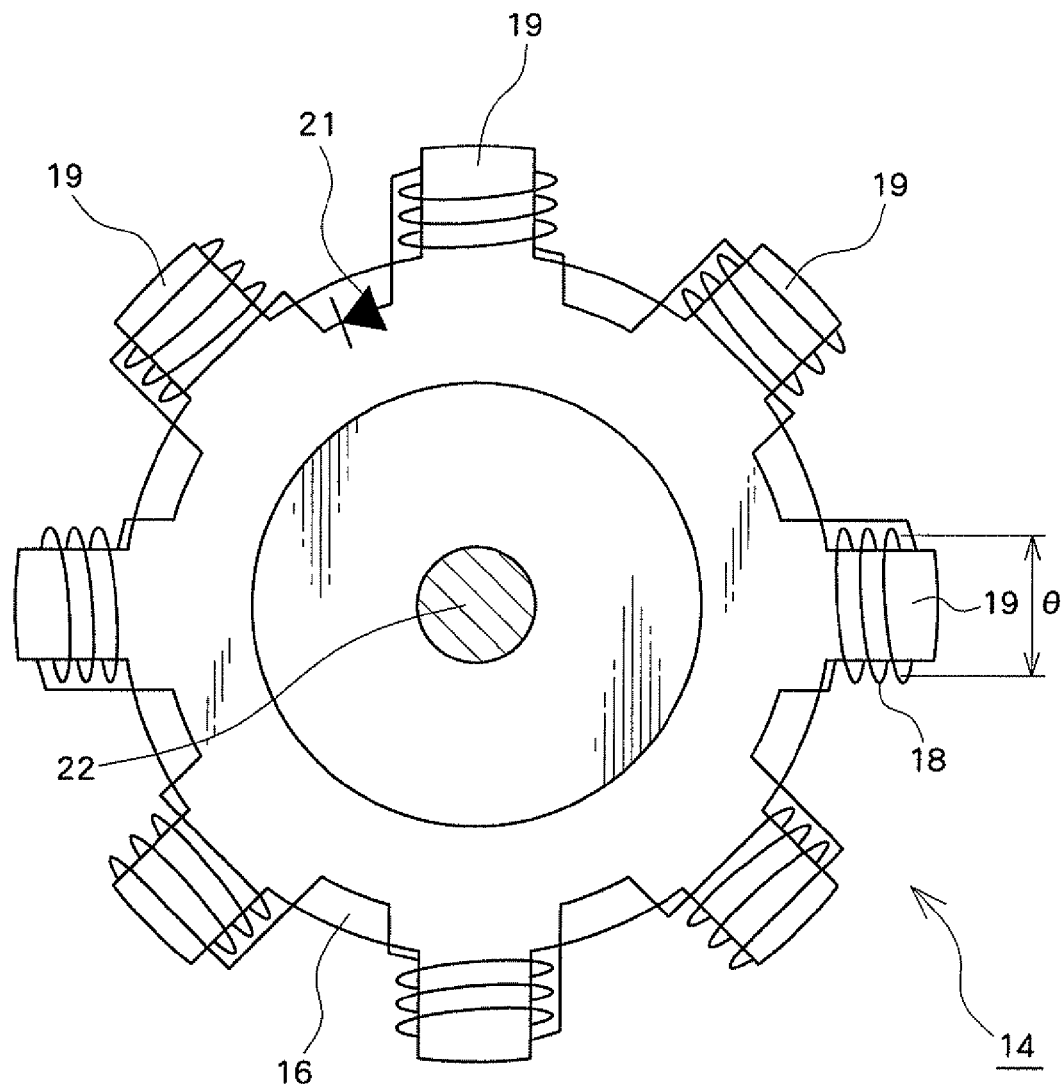
FIG. 13 is a view illustrating another schematic configuration of a rotary electric machine according to an embodiment of the present invention.

Further, in the present embodiment, for example, as illustrated in FIG. 13, a common rotor winding 18 can be wound around respective salient poles 19. According to the example configuration illustrated in FIG. 13, the rotor winding 18 is short-circuited via a diode 21. Therefore, the diode 21 rectifies the current so as to flow through the rotor winding 18 in one direction (as DC current). The magnetized directions of the rotor windings 18 wound around two salient poles 19, which are adjacent to each other in the circumferential direction, are opposite each other. To this end, the directions of the winding portions wound around the salient poles 19, which are adjacent to each other in the circumferential direction, are opposite each other. Even in the example configuration illustrated in FIG. 13, the rotating magnetic field that includes the space harmonics components formed by the stator 12 interlinks with the rotor winding 18. The DC current rectified by the diode 21 flows through the rotor winding 18 and magnetizes respective salient poles 19. As a result, each salient pole 19 can function as a magnet where the magnetic pole is fixed. In this case, the magnets having mutually different magnetic poles can be formed by two salient poles 19 that are adjacent to each other in the circumferential direction. According to the example configuration illustrated in FIG. 13, the total number of the diode 21 can be reduced to only one.

Figure 14:
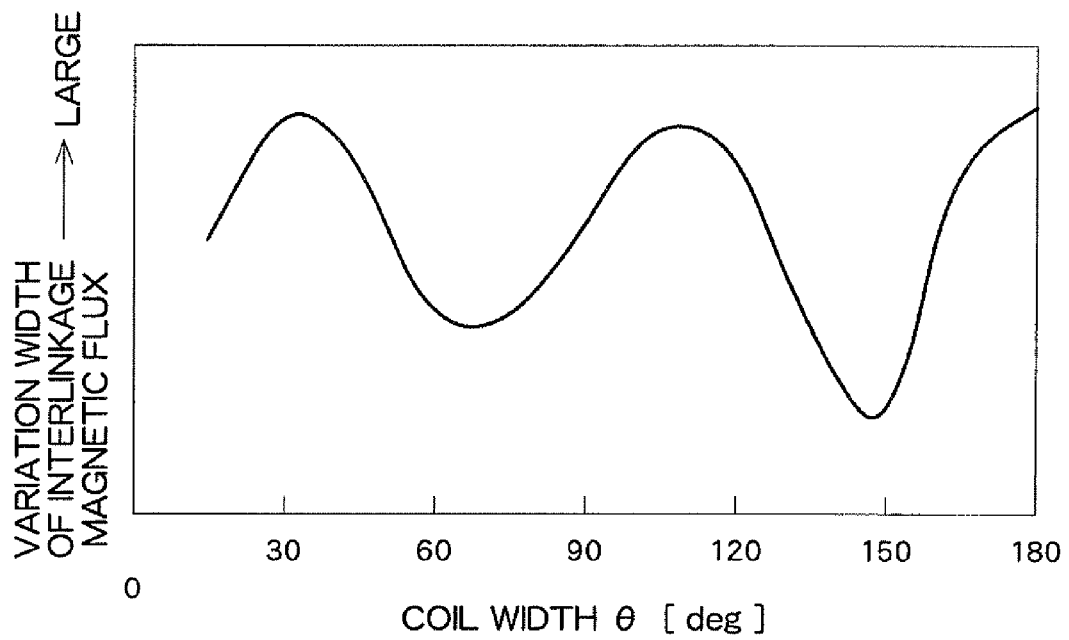
FIG. 14 illustrates a calculation result of the amplitude of a flux linkage that interacts with rotor windings, which can be obtained by changing a circumferential width θ of the rotor winding.

However, according to the example configuration illustrated in FIG. 13, magnetic flux variations (tertiary) caused by the space harmonics components of respective salient poles 19 may be canceled, because the common rotor winding 18 is used for the salient poles 19 that form the N-poles and the salient poles 19 that form the S-poles. Therefore, the torque of the rotor 14 may not effectively increase, as compared with other example configurations. FIG. 14 illustrates a calculation result of the amplitude (i.e., variation width) of the flux linkage that interacts with the rotor windings 18, which can be obtained by changing the circumferential width θ of the rotor winding 18 wound around each salient pole 19 in the example configuration illustrated in FIG. 13. In FIG. 14, the coil width θ is expressed using a value converted into an electric angle. As illustrated in FIG. 14, the variation width of the flux linkage that interacts with the rotor winding 18 greatly decreases if the coil width θ becomes smaller than 90°. Further, the variation width of the flux linkage that interacts with the rotor winding 18 greatly decreases if the coil width θ becomes greater than 120°. Further, considering the necessity of the coil width θ that can secure a sufficient cross section for the rotor winding 18, to further increase the induced current to be caused by the space harmonics generated by the rotor winding 18 in the example configuration illustrated in FIG. 13, the width θ of the rotor winding 18 in the circumferential direction is preferably set larger than the width corresponding to an electric angle of 90° of the rotor 14 and further to be smaller than the width corresponding to an electric angle of 120° of the rotor 14 (i.e., satisfy a relationship 90°<θ<120°). Further, as illustrated in FIG. 14, the amplitude of the flux linkage caused by the space harmonics has a peak at the coil width θ of 105°. Accordingly, to further increase the induced current to be caused by the space harmonics generated by the rotor winding 18 in the example configuration illustrated in FIG. 13, the width θ of the rotor winding 18 in the circumferential direction is preferably set equal to (or substantially equal to) the width corresponding to an electric angle of 105° of the rotor 14.

Figure 15:
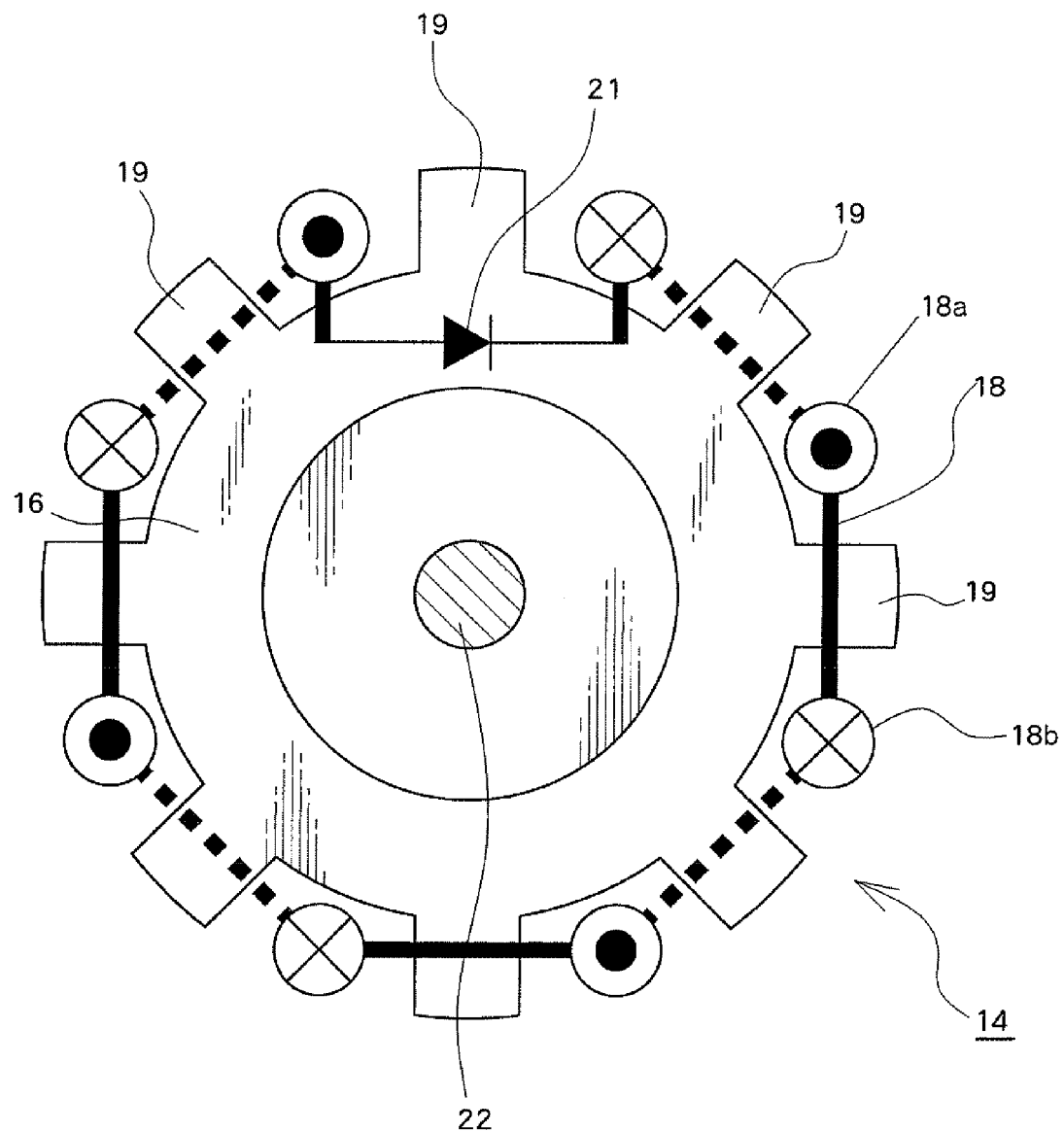
FIG. 15 is a view illustrating another schematic configuration of a rotary electric machine according to an embodiment of the present invention.

Further, according to the example configuration illustrated in FIG. 15, the rotor winding 18 is wound around each salient pole 19 by wave winding (i.e., series winding). The magnetized directions of the salient poles 19, which are adjacent to each other in the circumferential direction, are opposite each other. To this end, the directions of the winding portions wound around the salient poles 19, which are adjacent to each other in the circumferential direction, are opposite each other. In FIG. 15, a solid line portion of the rotor winding 18 extends along one side of the salient pole 19 (i.e., the foreside of the drawing), which corresponds to one end surface side of the salient pole 19 in the rotational shaft direction. A dotted line portion of the rotor winding 18 extends along the other side of the salient pole 19 (i.e., the backside of the drawing), which corresponds to the other surface side of the salient pole 19 in the rotational shaft direction. Further, a portion 18a indicated by ○ (white circle mark) with ● (black circle mark) positioned therein is a portion where the current flows in a forward direction relative to the drawing surface. A portion 18b indicated by ○ (white circle mark) with x (crossing mark) positioned therein is a portion where the current flows in a backward direction relative to the drawing surface. Even in the example configuration illustrated in FIG. 15, the rotating magnetic field that includes the space harmonics components formed by the stator 12 interlinks with the rotor winding 18. The DC current rectified by the diode 21 flows through the rotor winding 18 and magnetizes respective salient poles 19. As a result, each salient pole 19 can function as a magnet where the magnetic pole is fixed. In this case, the magnets having mutually different magnetic poles can be formed by two salient poles 19 that are adjacent to each other in the circumferential direction. According to the example configuration illustrated in FIG. 15, the total number of the diode 21 can be reduced to only one.

In the above-described embodiments, the stator 12 and the rotor 14 are disposed in spaced confronting relationship in the radial direction that is perpendicular to the rotational shaft 22. However, the rotary electric machine 10 according to the present embodiment can be configured as an axial-type rotary electric machine, in which the stator 12 and the rotor 14 are disposed in spaced confronting relationship in a direction parallel to the rotational shaft 22 (i.e., in the rotational shaft direction).

Although some embodiments for implementing the present invention have been described, the present invention is not limited to the above-described embodiments and can be embodied in various manners without departing from the gist of the present invention.

The invention claimed is:

1. A rotary electric machine comprising:
a stator that includes a stator core on which a plurality of slots are formed and spaced apart from each other in a circumferential direction around a rotor rotational shaft, and stator windings of a plurality of phases that are provided in the slots and wound around the stator core by concentrated winding, in which a rotating magnetic field including harmonics components is formed when AC currents flow through the stator windings; and
a rotor that includes a rotor core, rotor windings wound around the rotor core to generate an induced electromotive force when interlinked with the rotating magnetic field including the harmonics components formed by the stator, and a rectifying element that rectifies currents flowing through the rotor windings in response to generation of the induced electromotive force,
wherein:
the stator and the rotor are disposed in spaced confronting relationship,
the rotor core includes a plurality of magnetic pole portions, around which the rotor windings are wound, which can function as magnets where the magnetic pole is fixed, the magnetic pole portions are magnetized when the currents rectified by the rectifying element flow through the rotor windings, the magnetic pole portions are disposed in spaced confronting relationship with the stator in a state where the magnetic pole portions are spaced apart from each other in the circumferential direction,
the rotor windings are wound around all of the magnetic pole portions by short-pitch winding,
in the stator, the rotating magnetic field including the harmonics components caused by the arrangement of the stator windings is formed when AC currents having an electric frequency corresponding to a basic wave component of the rotating magnetic field flow through the stator windings, and
the rotor windings generate an induced electromotive force when interlinked with the harmonics components contained in the rotating magnetic field formed by the stator.

2. The rotary electric machine according to claim 1, wherein
a width of the rotor winding wound around each magnetic pole portion in the circumferential direction is substantially equal to a width corresponding to an electric angle of 9°.

3. The rotary electric machine according to claim 1, wherein
each magnetic pole portion of the rotor core has a magnetic resistance that is smaller than a magnetic resistance of a portion corresponding to a position between magnetic pole portions in the circumferential direction.

4. The rotary electric machine according to claim 1, wherein each magnetic pole portion of the rotor core projects toward the stator.

5. The rotary electric machine according to claim 1, wherein
the rotor includes a permanent magnet provided at a portion corresponding to a position between magnetic pole portions in the circumferential direction.

6. The rotary electric machine according to claim 1, wherein
the rotor windings wound around respective magnetic pole portions are electrically isolated from each other,
the rectifying element is provided for each of the rotor windings that are electrically isolated, and
respective rectifying elements rectify currents that flow through the rotor windings wound around respective magnetic pole portions in such a manner that magnetic poles of the magnetic pole portions alternate in the circumferential direction.

7. The rotary electric machine according to claim 1, wherein
rotor windings wound around the magnetic pole portions that are adjacent to each other in the circumferential direction are electrically isolated from each other,
the rectifying element is provided for each of the rotor windings that are electrically isolated, and
respective rectifying elements rectify currents that flow through rotor windings wound around the magnetic pole portions, which are adjacent to each other in the circumferential direction, in such a way as to differentiate directions of the magnetic poles of the neighboring magnetic pole portions.

8. The rotary electric machine according to claim 7, wherein
rotor windings wound around the magnetic pole portions that can function as magnets having the same magnetic pole are electrically connected.

9. A rotary electric machine comprising:
a stator that includes a stator core on which a plurality of slots are formed and spaced apart from each other in a circumferential direction around a rotor rotational shaft, and stator windings of a plurality of phases that are provided in the slots and wound around the stator core by concentrated winding, in which a rotating magnetic field including harmonics components is formed when AC currents flow through the stator windings; and a rotor that includes a rotor core, rotor windings wound around the rotor core to generate an induced electromotive force when interlinked with the rotating magnetic field including the harmonics components formed by the stator, and a rectifying element that rectifies currents flowing through the rotor windings in response to generation of the induced electromotive force, wherein:

the stator and the rotor are disposed in spaced confronting relationship, the rotor core includes a plurality of magnetic pole portions, which can function as magnets where the magnetic pole is fixed, the magnetic pole portions are magnetized when the currents rectified by the rectifying element flow through the rotor windings, the magnetic pole portions are disposed in spaced confronting relationship with the stator in a state where the magnetic pole portions are spaced apart from each other in the circumferential direction, a width of each magnetic pole portion in the circumferential direction is smaller than a width corresponding to an electric angle of 180°, in the stator, the rotating magnetic field including the harmonics components caused by the arrangement of the stator windings is formed when AC currents having an electric frequency corresponding to a basic wave component of the rotating magnetic field flow through the stator windings, and the rotor windings generate an induced electromotive force when interlinked with the harmonics components contained in the rotating magnetic field formed by the stator.

10. The rotary electric machine according to claim 9, wherein the width of each magnetic pole portion in the circumferential direction is substantially equal to a width corresponding to an electric angle of 90'.

11. The rotary electric machine according to claim 9, wherein the rotor core further includes an annular core portion, the rotor windings are wound around the annular core portion by toroidal winding, and each magnetic pole portion projects from the annular core portion toward the stator.

12. A rotary electric machine including a stator and a rotor that are disposed in spaced confronting relationship, wherein the stator includes a stator core on which a plurality of slots are formed and spaced apart from each other in a circumferential direction around a rotor rotational shaft, and stator windings of a plurality of phases that are provided in the slots and wound around the stator core by concentrated winding, in which a rotating magnetic field including harmonics components is formed when AC currents flow through the stator windings; and the rotor includes a rotor core, rotor windings wound around the rotor core to generate an induced electromotive force when interlinked with the rotating magnetic field including the harmonics components formed by the stator, and a rectifying element that rectifies currents flowing through the rotor windings in response to generation of the induced electromotive force;

wherein:

the rotor core includes a plurality of magnetic pole portions that can function as magnets where the magnetic pole is fixed, the magnetic pole portions are magnetized when the currents rectified by the rectifying element flow through the rotor windings, the magnetic pole portions are disposed in spaced confronting relationship with the stator in a state where the magnetic pole portions are spaced apart from each other in the circumferential direction, the rotor windings are a common rotor winding wound around each magnetic pole portion, directions of winding portions of the common rotor winding, which are wound around magnetic pole portions that are adjacent to each other in the circumferential direction, are opposite each other, and a width of the rotor winding wound around each magnetic pole portion is set to be larger than a width corresponding to an electric angle of 90° in the circumferential direction and smaller than a width corresponding to an electric angle of 120°.

13. A driving controller for a rotary electric machine, comprising:

the rotary electric machine defined in claim 1; and a control unit that controls the phase of AC currents that flow through the stator windings to control the torque of the rotor.

14. A driving controller for a rotary electric machine, comprising:

the rotary electric machine defined in claim 9; and a control unit that controls the phase of AC currents that flow through the stator windings to control the torque of the rotor.

15. A driving controller for a rotary electric machine, comprising:

the rotary electric machine defined in claim 12; and a control unit that controls the phase of AC currents that flow through the stator windings to control the torque of the rotor.

* * * * *

UNITED STATES PATENT AND TRADEMARK OFFICE
CERTIFICATE OF CORRECTION

PATENT NO.        : 8,847,455 B2
APPLICATION NO.   : 12/740044
DATED             : September 30, 2014
INVENTOR(S)       : Kenji Hiramoto et al.

Page 1 of 1

It is certified that error appears in the above-identified patent and that said Letters Patent is hereby corrected as shown below:

In the Claims

Column 16, line 21, Claim 2, "9°'" should read --"90°'"--.

Column 17, line 42, Claim 10, "90" should read --"90°"--.

Signed and Sealed this
Twenty-fourth Day of February, 2015

Michelle K. Lee
*Deputy Director of the United States Patent and Trademark Office*